US008244762B2

(12) United States Patent
Cimino (10) Patent No.: US 8,244,762 B2
(45) Date of Patent: Aug. 14, 2012

(54) METHOD FOR CONFIGURING AN IC CARD IN ORDER TO RECEIVE PERSONALIZATION COMMANDS

(75) Inventor: Carlo Cimino, Acerra (IT)

(73) Assignee: Incard S.A., Geneva (CH)

( * ) Notice: Subject to any disclaimer, the term of this patent is extended or adjusted under 35 U.S.C. 154(b) by 394 days.

(21) Appl. No.: 11/771,123

(22) Filed: Jun. 29, 2007

(65) Prior Publication Data

US 2008/0126398 A1    May 29, 2008

(30) Foreign Application Priority Data

Jun. 29, 2006 (EP) ..................................... 06013460

(51) Int. Cl.
*G06F 17/30* (2006.01)
(52) U.S. Cl. ........ 707/785; 707/700; 707/781; 707/786; 707/787; 707/788; 235/382
(58) Field of Classification Search .................. 707/638, 707/700, 781, 785–788; 235/382
See application file for complete search history.

(56) References Cited

U.S. PATENT DOCUMENTS

| 5,889,941 | A | * | 3/1999 | Tushie et al. ...................... 726/26 |
| 6,957,776 | B1 | * | 10/2005 | Ng ................................ 235/474 |
| 2001/0025878 | A1 | * | 10/2001 | Hendrick ........................ 235/375 |
| 2002/0117542 | A1 | | 8/2002 | Hamann et al. ................. 235/380 |
| 2005/0156029 | A1 | * | 7/2005 | Hopkins ......................... 235/382 |
| 2005/0171983 | A1 | * | 8/2005 | Deo et al. ....................... 707/202 |
| 2006/0059348 | A1 | * | 3/2006 | Girard et al. ................... 713/176 |
| 2007/0204148 | A1 | * | 8/2007 | Sakamura et al. .............. 713/156 |
| 2007/0208750 | A1 | * | 9/2007 | Carmeli et al. .................. 707/10 |
| 2008/0010675 | A1 | * | 1/2008 | Massascusa et al. .............. 726/9 |
| 2008/0134341 | A1 | * | 6/2008 | Sakamura et al. ............... 726/27 |
| 2009/0192907 | A1 | * | 7/2009 | Bossemeyer et al. ............ 705/17 |

FOREIGN PATENT DOCUMENTS

| DE | 19536548 | 4/1997 |
| DE | 19939280 | 2/2001 |
| DE | 10331799 | 2/2005 |
| GB | 233630 A | 7/1999 |
| WO | 98/25239 | 6/1998 |

OTHER PUBLICATIONS

Winsor, Janice, Solaris 7 Reference, Aug. 19, 1999, Prentice Hall, ISBN 978-0-13-020048-8, chapter 18, level 1, section 25.*

* cited by examiner

*Primary Examiner* — Frantz Coby
(74) *Attorney, Agent, or Firm* — Allen, Dyer, Doppelt, Milbrath & Gilchrist, P.A.

(57) ABSTRACT

An IC card is configured to receive personalization commands which are used to transmit data to the IC card. An access control list is associated with the data. The data is stored in the IC card in a record structure that includes a plurality of entries. The access control list is stored in the IC card in the record structure. The personalization commands include a card personalization specification (CPS).

23 Claims, 4 Drawing Sheets

*FIG. 1*
*PRIOR ART*

| DGI | LENGTH | VALUE |
|---|---|---|
| 2-BYTE IDENTIFIER OF THE DATA GROUPING | LENGTH OF THE DATA GROUPING | DATA → |

FIG. 2
*PRIOR ART*

| DGI | | LENGTH | VALUE |
|---|---|---|---|
| SFI | RECORD NUMBER | LENGTH OF THE DATA GROUPING | RECORD DATA |

FIG. 3A
*PRIOR ART*

FILE A:
| FID | fidA |
|---|---|
| READ ACCESS | FREE ('0') |
| UPDATE ACCESS | FREE ('0') |
| CONTENT | dataA1, dataA2, dataA3 |

FILE B:
| FID | fidB |
|---|---|
| READ ACCESS | FREE ('0') |
| UPDATE ACCESS | FORBIDDEN('F') |
| CONTENT | dataB1, dataB3 |

FILE C:
| FID | fidC |
|---|---|
| READ ACCESS | PIN VERIF. ('1') |
| UPDATE ACCESS | FREE ('0') |
| CONTENT | dataC1, dataC3 |

FILE D:
| FID | fidD |
|---|---|
| READ ACCESS | FREE ('0') |
| UPDATE ACCESS | PIN VERIF. ('1') |
| CONTENT | dataD1 |

FILE E:
| FID | fidE |
|---|---|
| READ ACCESS | PIN VERIF. ('1') |
| UPDATE ACCESS | FORBIDDEN ('F') |
| CONTENT | dataE2 |

| FILE WITH | REC. NUM. | READ ACCESS | UPDATE ACCESS | VALUE | |
|---|---|---|---|---|---|
| SFI='01' | '01' | FREE ('0') | FREE ('0') | dataA1 | ←r1 |
| | '02' | FREE ('0') | FORBIDDEN ('F') | dataB1 | |
| F1 | '03' | PIN VERIF. ('1') | FREE ('0') | dataC1 | |
| | '04' | FREE ('0') | PIN VERIF. ('1') | dataD1 | |

| FILE WITH | REC. NUM. | READ ACCESS | UPDATE ACCESS | VALUE | |
|---|---|---|---|---|---|
| SFI='02' | '01' | FREE ('0') | FREE ('0') | dataA2 | ←r2 |
| F2 | '02' | PIN VERIF. ('1') | FORBIDDEN ('F') | dataE2 | |

| FILE WITH | REC. NUM. | READ ACCESS | UPDATE ACCESS | VALUE | |
|---|---|---|---|---|---|
| SFI='03' | '01' | PIN VERIF. ('1') | FREE ('0') | dataC3 | ←r3 |
| | '02' | FREE ('0') | FREE ('0') | dataA3 | |
| F3 | '03' | FREE ('0') | FORBIDDEN ('F') | dataB3 | |

Labels: EN1, AL1, VAL1, AL2, VAL2

FIG. 4B

LINK-PORT, INDEX-PORT, LENGTH-PORT, VAL-PORT

| DGI | | LENGTH | VALUE | |
|---|---|---|---|---|
| SFI | REC. NUM. | LENGTH OF THE RECORD | RECORD DATA | |
| '01' | '01' | '02' | dataA1 | ←R1 |
| '01' | '02' | '01' | dataB1 | ←R2 |
| '01' | '03' | '03' | dataC1 | ←R3 |
| '01' | '04' | '04' | dataD1 | ←R4 |
| '02' | '01' | '01' | dataA2 | |
| '02' | '02' | '02' | dataE2 | |
| '03' | '01' | '03' | dataC3 | |
| '03' | '02' | '02' | dataA3 | |
| '03' | '03' | '01' | dataB3 | |

FIG. 4C

METHOD FOR CONFIGURING AN IC CARD IN ORDER TO RECEIVE PERSONALIZATION COMMANDS

FIELD OF THE INVENTION

The present invention relates to a method for configuring an integrated circuit (IC) card to receive personalization commands, wherein the personalization commands are used to transmit data to the IC card. More particularly, the present invention relates to configuring the IC card for supporting personalization of data stored in a plurality of entries.

BACKGROUND OF THE INVENTION

Figure 1:
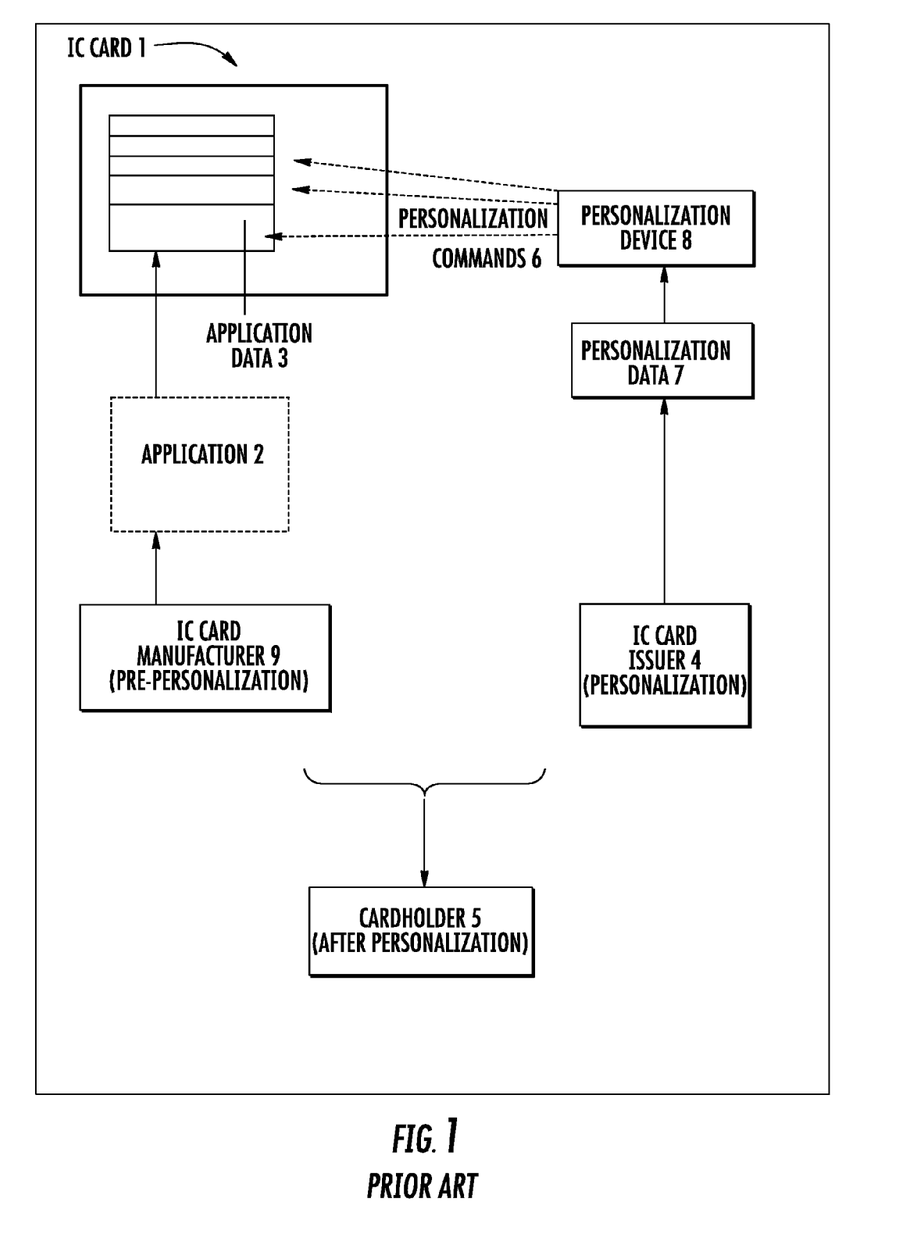
FIG. 1 schematically shows a pre-personalization and a personalization phase of an IC card application according to the prior art.

An IC card comprises at least a memory unit that stores one or more applications, such as an application to interface a payment system or an application for a verification or identification system, for example. With reference to FIG. 1, an IC card 1 comprising a memory unit for storing an application 2 is schematically represented.

The current manufacturing process provides for a procedure wherein an IC card manufacturer 9 is in charge of a pre-personalization phase of the IC card 1. For example, the IC manufacturer is asked to define the IC card file structure and/or a data structure for managing file and data storage, as well as storing secure keys and one or more applications 2 inside the memory unit.

More particularly, the applications 2 are stored by the IC card manufacturer 9 in a basic version and are personalized only after the pre-personalization phase. The IC card manufacturer 9 then releases the IC card 1 to an issuer entity 4, generally providing a how to do method for helping the issuer entity 4 for managing the personalization of the IC card 1.

The application 2 comprises a plurality of application data 3 that needs to be initialized by the issuer entity 4 before the final releasing of the IC card 1 to a cardholder 5. The issuer entity 4 uses a personalization device 8 for sending a plurality of personalization commands 6 to the IC card 1. The personalization command 6 initializes the application data 3 to corresponding values. More particularly, the issuer entity 4 prepares a set of personalization data 7 to be entered to the personalization device 8, wherefrom corresponding personalization commands 6 are generated and sent to the IC card 1.

A format of such personalization data 7 depends on the application 2, and also the internal file and data structure of the IC card 1 that hosts such an application. In fact, a same application 2 stored on two different IC cards 1, respectively provided by two different IC card manufacturers 9, could require different personalization data to be initialized.

So the issuer entity 4 should write personalization data 7 according to the file and/or data structure of the IC card 1, as well as other internal specifics of the IC card 1. For example, the secure keys may be pre-stored, the basic version of the applications 2 may be pre-stored in the memory unit, and so on.

According to the upgrading of an application 2, the issuer entity 4 needs to provide a new set of personalization data 7 intended to personalize such an upgraded application 2. In the same way the issuer entity 4 should act when the file and/or data structure definition of the IC card 1 is changed, for example due to an upgrading of a microchip hosted inside it. The new personalization data 7 is to comply to the new release of the application 2, or to the new IC card microchip.

For this reason, the preparation of personalization data 7 is particularly expensive and time consuming for an issuer entity 4, especially considering the increasing number of applications 2 hosted in an IC card 1. To address this problem some well known credit card payment systems, for example Europay, Master Card International and Visa International Service have adopted a common method to personalize the application 2. This is done with the objective of reducing the cost of personalization, and facilitating the migration to new microchip and/or applications 2.

This common method, actually known as EMV CPS (Europay Master Card International and Visa International Service Card Personalization Specification), is referred by designers of applications 2, designers of personalization device 8 and designers of personalization data 7 to simplify the personalization of IC card applications 2. More particularly, not only CPS (Card Personalization Specification) but a general method to personalize applications could be implemented and could provide the same benefit provided by CPS if it were adopted as a standard for personalization.

As CPS has been promoted on a wide scale, it has become a recognized standard by payment systems. CPS offers benefits which include lower set up costs, a faster time to market, greater choice of suppliers (manufacturer and personalization bureau) and an enhanced ability to switch suppliers.

Figure 2:
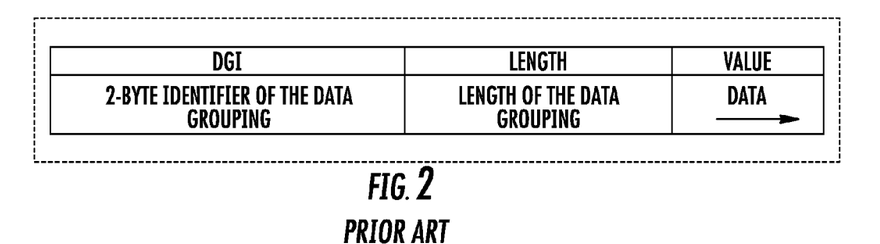
FIG. 2 schematically shows a data grouping for personalization data complying to the known standard CPS (Card Personalization Specification) according to the prior art.

According to CPS, the personalization data 7 are organized into data groupings, as schematically shown in FIG. 2. Each data group is identified by a data grouping identifier DGI, followed by the length of the data group and its value. During the personalization of the IC card 1, the personalization device 8 parses a list of data groups and sends it to the IC card 1. On receipt, the IC card application 2 uses the data grouping identifier DGI to determine how the data grouping received from the personalization device 8 is to be processed.

CPS may be used also to create a file system for the IC card. More particularly, a file system created with CPS comprises a plurality of elementary files EFs with a linear structure and records of variable sizes. Each elementary file EF is referenced through a short file identifier SFI, as schematically shown in FIG. 3A.

Unfortunately, in a file system created through CPS, the standard ISO security attributes are not provided. These attributes are generally used for defining an access level to elementary files EFs. In a file system created with CPS, a terminal connected to the IC card may only read records of elementary files EFs through specific commands, such as through a READ RECORD command, for example.

A list AFL identifies the files and records to be used in processing of a transaction, and defines the records that may be acceded. In other words, there is a possibility of not defining the access level on the elementary record. This is a record accessibility predefined and not changeable during personalization. To create the file system of an application 2 through the CPS common method, only the record values need to be personalized.

Figure 3A:
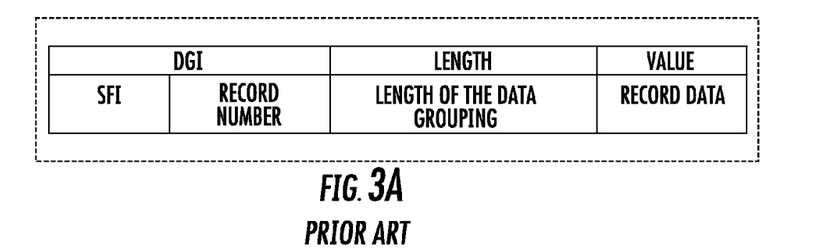
FIG. 3A schematically shows a data grouping for a record complying to CPS according to the prior art.

With reference to FIG. 3A, the first byte of the data grouping identifier DGI indicates the SFI of the elementary file EF containing the record. The second byte indicates the record number, and the data grouping is the record for the application. Even if a file system created with CPS is particularly indicated to guarantee security of a payment system, it is not indicated for applications 2 requiring the definition of an access level on elementary files.

Some applications 2 in fact, generally not directed to banking systems, need to define an access level to the application data, and consequently they are not created through the CPS common method. Such applications 2 need a file system supporting the definition of access level in single elementary files. Access conditions to application data 3 of the IC card application 2 are defined by personalization data 7.

Figure 3B:
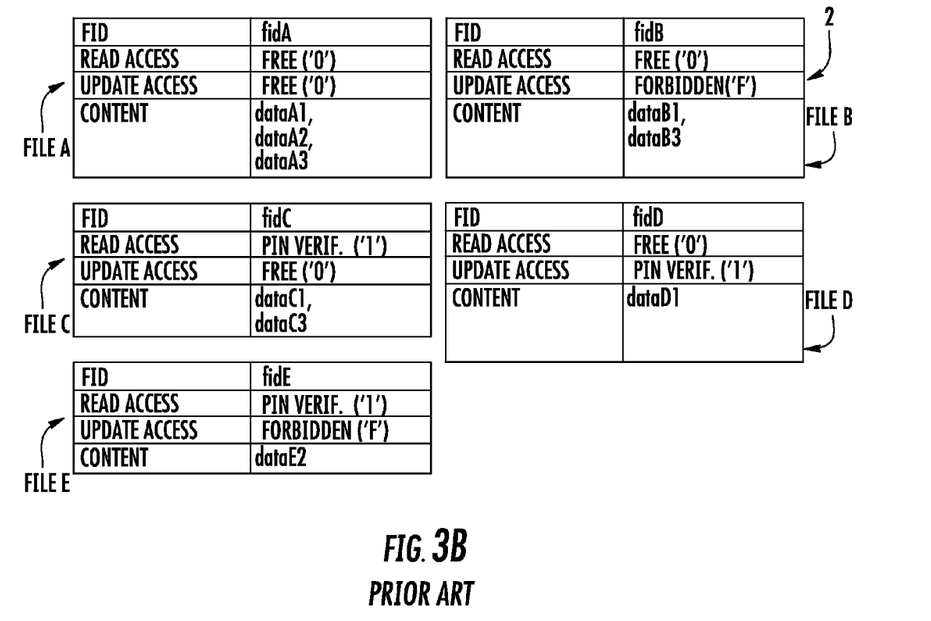
FIG. 3b schematically shows an application including at least three files having a first format according to the prior art.

With more specific reference to FIG. 3b, schematically represented is a first plurality of files respectively indicated with file identifiers fidA, fidB, fidC, fidD, and fidE. The files represent an application 2 in a first file format for an IC card 1.

Each single file fidA, fidB, fidC, fidD, and fidE comprises a plurality of data associated to a corresponding offset into a file body. For example, the file identified by file identifier fidA comprises three data, respectively indicated with dataA1, dataA2, and dataA3.

The first format representing the application 2 allows definition of an access level for each file fidA, fidB, fidC, fidD, fidE of the application 2. More particularly, different data dataA1, dataA2, dataA3 inside a same fidA cannot be associated to different access levels. In other words, a grouping of information inside the application 2 is based on access level, and information cannot be grouped by logical content. This is because an access level is related to a file fidA, fidB, fidC, fidD, fidE and not to a single data, dataA1, dataA2, dataA3.

Actually, it is not known how to create a file system for an application 2 through a common method, as CPS, and keeping at the same time the possibility to define the access level on its elementary files. Nor is there a known method to create personalization data 7 for an application 2 based on a file system that supports definition of the access level.

The current common practice is to provide different IC card manufacturers 9 designs of their own file system, and their own application. This leaves to the issuer entity 4 the burden to personalize the applications 2 with personalization data 7. This personalization data 7 is difficult to prepare, time consuming and subject to modification due to the changing or updating of applications, as well as to the changing of the manufacturer 9 supplying such an IC card 2.

SUMMARY OF THE INVENTION

In view of the foregoing background, an object is to configure an IC card to organize data and applications according to a file structure for defining an access level on data that is not expensive and time consuming.

Configuring an IC card is typically expensive and time consuming due to the lack of a common personalization method, while configuration of an IC card to organize data and applications according to a record structure does not support the definition of an access level on data. Any changing or upgrading of an application inside a same IC card as well as the storing of such an application in an IC card provided by a different manufacturer requires modification of expensive and time consuming personalization.

This and other objects, advantages and features are provided by associating an access control list to the data entries so as to obtain a configured IC card with data according to a record structure, wherein it is possible to personalize not only data but also access conditions to such data.

A method for configuring an IC card to receive personalization commands, wherein the personalization commands are intended to transmit data to the IC card, comprises associating at least one access control list to the data, storing the data in the IC card in a record structure. The record structure may comprise a plurality of entries for storing the at least an access control list in the IC card in the record structure. The personalization commands may be set-up according to a Card Personalization Specification (CPS).

BRIEF DESCRIPTION OF THE DRAWINGS

The features and advantages of the invention will be apparent from the following description of an embodiment thereof given by way of non-limiting examples with reference to the accompanying drawings.

DETAILED DESCRIPTION OF THE PREFERRED EMBODIMENTS

A method for configuring an IC card to organize data in a record structure is provided. Such a method supports not only a personalization of data but also a setting of access conditions on data. More particularly, the record structure comprises a plurality of entries.

An entry of the plurality of entries includes a short file identifier SFI. More particularly, more than one entry inside the plurality of entries may share a same short file identifier SFI, for example to group together more than one entry sharing a same logical content. In other words, more than one entry identified by a same short file identifier SFI belongs to a same entity.

Each entry also comprises a record number for identifying the entry with respect to other entries sharing a same short file identifier. The entries having a same short file identifier SFI are distinguished through their record numbers inside the plurality of entries. Each entry also comprises a value portion for storing data. The values of data are initialized during a personalization of the IC card 1, for example through a common or a standard method to personalize applications.

A detectable subset of the plurality of entries comprises an access control list to data stored in the value portions, inside the plurality of entries. Advantageously, the access control lists for data are also initialized during the personalization of the IC card 1, for example through the same common or standard method used to personalize data.

According to the method, it is also possible to define an access control level for each entry inside the plurality of entries. Such definition of access control level has a granularity more specific with respect to an access control level on files, in a file data structure.

In fact, a file generally comprises more than one data. An access control level is associated to the file and not to each single data stored in it. While a file is generally limited to storing data with different logical meanings, and grouped together because they use the same access control level, all the data belonging to a same logical content are grouped through a same short file identifier SFI inside the record structure. Advantageously, the data grouped together by the same short file identifier is associated to a specific access control level.

Figure 4A:
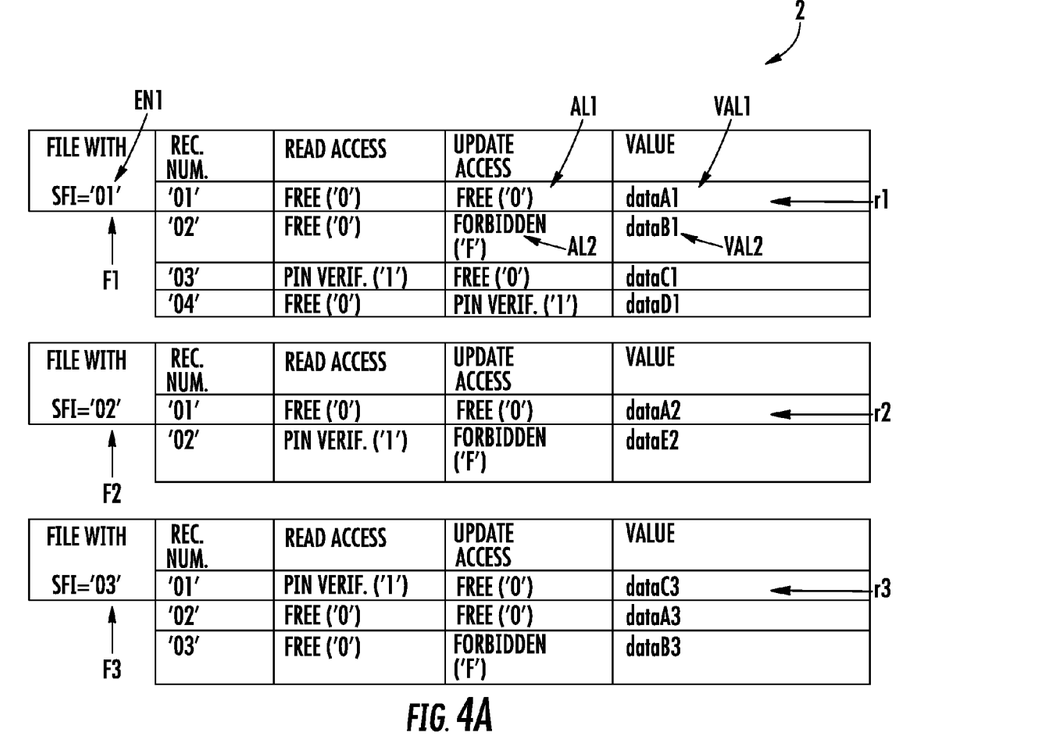
FIG. 4a schematically shows the application of FIG. 3b translated into a second format comprising a second plurality of entries according to the present invention.
Figure 4B:
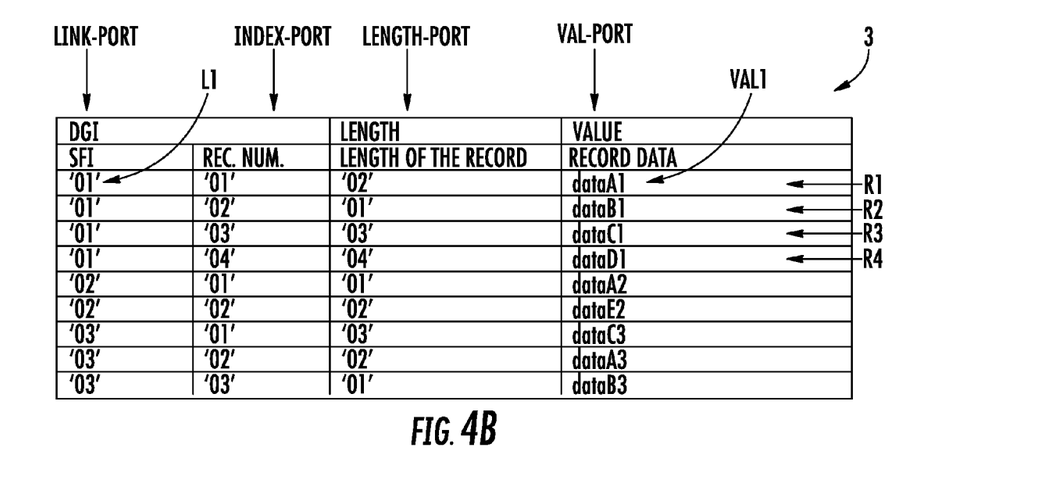
FIG. 4b schematically shows the personalization data for the plurality of entries of the translated application of FIG. 4a according to the present invention.

As it is schematically represented in FIG. 4b, the record format comprises a short file identifier "SFI", a record number "rec. num.", information relating to the length of the record "Length" and a value reported as "record data" but does not directly support the access level of a record.

More particularly, the record R1 comprises a first portion indicating the short file identifier SFI to which it refers, the record number 01 inside the file identified by short file identifier SFI, and the length 02 of the value stored in such a record and the value itself for instance dataA1. The access control list inside the record format is organized in an additional control record schematically represented in FIG. 4c.

Figure 4C:
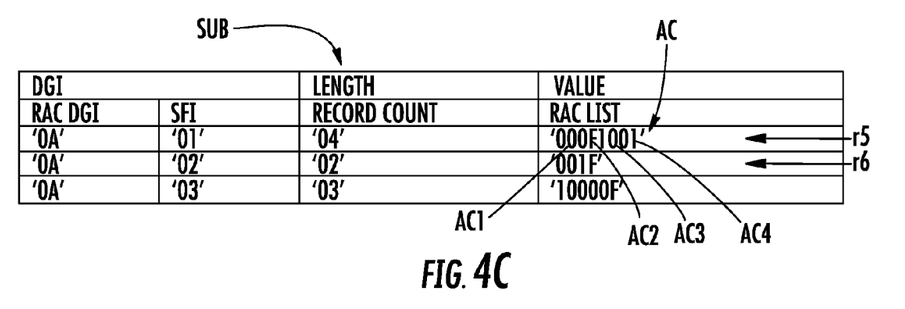
FIG. 4c schematically shows the personalization data for the access conditions for the second plurality of entries of FIG. 4b according to the present invention.

The control record R5 comprises a first portion "RAC DGI" indicating that such a control record is not a record of data because it does not correspond to value data but stores the access condition of records in the records format. The first portion RAC DGI of the record condition stores a system value or a predefine value for example 0A, that is generally not used to identify a short file identifier SFI.

A second portion of the record condition stores an RAC List portion including the access conditions of a plurality of records in the record format. The first element of the RAC list stores the access condition "0".

Advantageously, a common method to personalize the application 2 like CPS, already adopted by payment system like Europay, Master Card International and Visa International Service, may be adapted to personalize an application 2 stored on an IC card configured through the method according to the embodiment disclosed herein, thus facilitating the personalization as well as migration of applications 2.

The embodiment disclosed herein also relates to a method for transforming an application 2, from a first file format into a second record format. The method also comprises a phase for personalizing the application in the second record format.

The application 2 in the first format is represented in FIG. 3b, wherein a first plurality of files indicated with file identifiers fidA, fidE, fidC, fidD, and fidE are schematically represented. Each single file fidA, fidB, fidC, fidD and fidE comprises a plurality of data associated to a corresponding offset into a file body. For example, the file identified by the file identifier fidA comprises three data, respectively indicated with dataA1, dataA2, dataA3.

The first format representing the application 2 allows one to define an access level for each file fidA, fidB, fidC, fidD, and fidE of the application 2. The application 2 in the second records format is schematically represented in FIG. 4a as comprising a short file identifier "SFI", a record number "rec. num.", an access level for reading the record "read access", an access level for updating the record "update access", and information relating to the length of the record "Length" and a value "record data".

According to the method for transforming application of the present invention, any application 2 in a first file format like the one represented in FIG. 3b may be transformed or changed to a second file format, like the one represented in FIG. 4a.

More particularly, a file fidA of the application 2 in the first format comprising data dataA1, dataA2, and dataA3 is mapped into a plurality of records r1, r2, and r3 in the second record format, respectively storing data dataA1, dataA2, and dataA3. Advantageously, a grouping of information on the application 2, through the second format, is based on a logical content since an access level is related to a single data, dataA1, dataA2, dataA3 and not to a file.

As it is schematically represented in FIG. 4b, a personalization data for the second records format comprises a short file identifier "SFI", a record number "rec. num.", information relating to the length of the record "Length" and a value reported as "record data" but does not directly support the access level of a record.

More particularly, the record R1 comprises a first portion indicating the short file identifier SFI to which it refers, the record number 01 inside the file identified by short file identifier SFI, the length 02 of the value stored in such record and the value itself, for instance dataA1. The personalization data for the access conditions of each record inside the second records format are stored in an additional control record, schematically represented in FIG. 4c.

More particularly, the control record R5 comprises a first portion "RAC DGI" indicating that such a control record is not a record of data, because it does not correspond to data stored inside a file in a first file format, but stores the access condition of a plurality of records in a second record format.

The first portion RAC DGI of the record condition stores a system value or a predefined value, for example 0A, generally not used to identify a short file identifier SFI. A second portion of the record condition stores a RAC List portion, including the access conditions of a plurality of records, in the second record format.

With reference to FIG. 4c, the first element of the RAC list stores the access condition "0" (free access) since the corresponding record in the second file format was set on free access "0". Since the second file format indicates that the record 01 of the file F1 has free access (0), the control record R5 associated to such a record 01 of file F1 stores a corresponding value 0.

Advantageously, a common method to personalize the application 2 like CPS, already adopted by payment system like Europay, Master Card International and Visa International Service, may be adapted to personalize such an application 2. This facilitates the personalization as well as migration of the applications 2.

Advantageously, a same IC card 1 storing an application 2 intended to interface with a payment system and designed to be personalized with CPS may store a different purpose application 2, for example for a verification or identification system. This is even if such a different purpose application 2 uses a personalization data generally not supported by CPS. A record and linear structure provided by CPS is adapted to store application data wherein an access condition may be set during a personalization phase.

The method for transferring an application is advantageously adopted to support personalization of any application transformed from a first format to a second format. More particularly, the method for transforming applications is directed to an application 2 intended to be stored in an IC card in a second format, and comprising a second plurality of entries associated to at least an access level.

The method for transforming the application 2 comprises transferring the application 2 from the first format into a second format comprising a second plurality of entries, personalizing a plurality of values of the second plurality of entries, and personalizing an access control level for the second plurality of entries that defines the accessibility of the second plurality of entries.

The access control level comprises a plurality of control records, each defining which of the second plurality of entries correspond to a same portion of entry of the first plurality of entries. The control record defines also the accessibility of the second plurality of entries, according to the accessibility of the same entry to which the second plurality of entries correspond. The control record defines also how many entries of the second plurality of entries correspond to the first entry.

Moreover, the method for transforming applications provides also the possibility to transform or change a plurality of sub-entries included in a single entry of the first plurality into a corresponding plurality of entries of the second plurality of entry. An access level of sub-entries is mapped, through a control record, into an access level for the entries of the second plurality as described above.

With more specific reference to FIG. 4b and 4c an application 2, intended to be stored in a memory unit of an IC card, is represented in a second format comprising a second plurality of entries F1, F2. Each entry F1 of the second plurality of entries F1, F2 includes an entry number EN1, indexing the same entry F1 and one or more values VAL1, VAL2. The entry F1 also comprises one or more access levels AL1 corresponding to the values VAL1 stores in the same entry.

The method for transforming applications comprises the following approach. The application 2 from the first format is transformed or changed to a second format, comprising a second plurality of records R1, . . . ,R6. Each record R1 of the second plurality includes at least one value VAL1 of the values VAL1, VAL2 of the first plurality.

The record R1 also comprises a link number L1, storing at least one entry number EN1 of the first plurality of entries. There is a phase of initializing at least one value VAL1 in the second plurality of records R1, . . . , R6. There is also a phase of storing, in a detectable sub-set SUB of the second plurality of records R5, R6, of at least an access control AC that relates to at least a value data A1 in the second plurality of records R1.

The method for transforming applications provides that the personalization phase is driven by a standard specification for IC card personalization. For example, CPS (Card Personalization Specification) may be adopted as the standard specification. Also, the phase of storing the at least one access control AC is driven by a standard specification for IC card personalization. More particularly, CPS may be adopted also as standard specification for the phase of initialization.

The record R1 in the second plurality of records R1, . . . , R6 comprises a first portion val-port for storing the value. The record R1 also comprises a second portion link-port for storing the link number. When a record belongs to the detectable sub-set SUB, the first portion val-port stores the access control AC.

The record R1 also comprises a third portion index-port storing an index for indexing a record inside the second plurality of records R1, . . . , R6. In a record R5 of the detectable sub-set SUB, the third portion index-port stores a special value for marking that the record R5 is inside the detectable sub-set SUB.

In a record R5 of the detectable sub-set SUB, the second portion link-port stores an index of a record R1 in the second plurality of records R1, . . . , R6. The record R1 comprises a fourth portion Len-port storing a length of the value data A1 in the second plurality of records R1, . . . , R6.

In at least a record R5 of the detectable sub-set, the fourth portion Len-port reports how many access controls AC1, . . . , AC4 are stored in the corresponding first portion value-port.

The first plurality of entries may, for example, be a plurality of files. The second plurality of entries may, for example, be a plurality of records. For example, the following access condition on records may be defined: free access; access forbidden; entity authentication with a password, such a PIN verification performed during an application session; data authentication, such as secure messaging with MAC calculation used for a command; data such as a secure messaging with encryption used for a command; and entity authentication with a key, such as an external authentication performed during the an application session.

The following TABLE 1 defines the above listed access conditions through four bites, b1, b2, b3, b4:

TABLE 1

| b4 | b3 | b2 | b1 | Meaning |
|---|---|---|---|---|
| X | X | X | X | access condition |
| 0 | 0 | 0 | 0 | Free access |
| 0 | 0 | 0 | 1 | PIN verification |
| 0 | 0 | 1 | 0 | Secure messaging with MAC calculation |
| 0 | 0 | 1 | 1 | Secure messaging with MAC calculation + PIN |
| 0 | 1 | 0 | 0 | Secure messaging with MAC and encryption |
| 0 | 1 | 0 | 1 | MAC and encryption + PIN |
| 0 | 1 | 1 | 0 | RFU |
| 0 | 1 | 1 | 1 | RFU |
| 1 | 0 | 0 | 0 | External authentication |
| 1 | 0 | 0 | 1 | External authentication + PIN |
| 1 | 0 | 1 | 0 | External authentication + MAC |
| 1 | 0 | 1 | 1 | External authentication + MAC + PIN |
| 1 | 1 | 0 | 0 | External authentication + MAC and encryption |
| 1 | 1 | 0 | 1 | External authentication + MAC and encryption + PIN |
| 1 | 1 | 1 | 0 | RFU |
| 1 | 1 | 1 | 1 | Forbidden |

The Record Access Condition may be defined for read or write permission on the single record. Four additional bits may be used to define two conditions for reading and updating the records. The four high bits of the byte for READ RECORD and the four low for UPDATE RECORD, as detailed in the following TABLE 2.

TABLE 2

| b8 | b7 | b6 | b5 | b4 | b3 | b2 | b1 | Meaning |
|---|---|---|---|---|---|---|---|---|
| X | X | X | X | | | | | READ RECORD access condition |
| 0 | 0 | 0 | 0 | | | | | Free access |
| — | — | — | X | | | | | PIN verification |
| — | — | X | — | | | | | Secure messaging with MAC calculation |
| — | X | — | — | | | | | Secure messaging with MAC and encryption |
| X | — | — | — | | | | | External authentication |
| 1 | 1 | 1 | 1 | | | | | Forbidden |
| | | | | X | X | X | X | UPDATE RECORD access condition |
| | | | | 0 | 0 | 0 | 0 | Free access |
| | | | | — | — | — | X | PIN verification |
| | | | | — | — | X | — | Secure messaging with MAC calculation |
| | | | | — | X | — | — | Secure messaging with MAC and encryption |
| | | | | X | — | — | — | External authentication |
| | | | | 1 | 1 | 1 | 1 | Forbidden |

For example, the record access condition byte may be defined for each record during the personalization of the application 2. For example, the DGIs in the range 'A0'XX, where '01'≦XX≦'1E', may represent the short file identifier SFI of the file while the remaining DGI may be used to personalize the record access conditions.

The DGI may contain the list of the access conditions for its records, according to the following TABLE 3:

TABLE 3

| Data Element | Length |
| --- | --- |
| RAC byte for the record number '01' | 1 |
| RAC byte for the record number '02' | 1 |
| ... | ... |
| RAC byte for the record number YY | 1 |
| ... | ... |
| RAC byte for the record number 'FF' | 1 |

A personalization for an application stored inside an IC card provided by a first manufacturer, more particularly a personalization of an application using the definition of an access level for applications data, is provided by a common personalization method that is independent by a changing of the application. It is also independent by the storing of such an application in a second IC card provided by a second manufacturer. The personalization is particularly advantageous because it is not difficult to execute and is not time consuming.

An embodiment relates to an IC card storing data according to a record structure, including a plurality of entries for storing data, with a subset of the plurality of entries storing at least an access control list to the data. Advantageously, the IC card is configured through the method for configuring data and application described above, and may be personalized according to a standard personalization method like CPS.

More particularly, the IC card is configured to receive personalization commands for storing a plurality of data inside the IC card. At least an access control list is associated with the plurality of data.

Data inside the IC card is stored in a record structure comprising a plurality of entries, and the at least an access control list inside the IC card is stored in the same record structure. Advantageously, the personalization commands comprises a Card Personalization Specification, for example CPS.

That which is claimed:

1. A method for configuring an IC card to receive personalization commands intended to transmit data to the IC card, the method comprising:
    associating at least one access control list to the data;
    storing the data in the IC card in a record structure having a plurality of entries, each entry including a first portion storing data values, a second portion storing a short file identifier associated with the data values, and a third portion storing a record number associated with the data values; and
    storing the at least one access control list in a detectable subset of the plurality of entries of the record structure.

2. A method according to claim 1, wherein the personalization commands are configured according to the Card Personalization Specification.

3. A method according to claim 1, wherein the personalization commands comprise an initialization of the value portion.

4. A method according to claim 1, wherein the personalization commands include an initialization of the at least one access control list with at least one access control value.

5. A method according to claim 4, further comprising associating the at least one access control value to a corresponding portion of data.

6. A method for transforming an IC card application of a first format comprising a first plurality of entries, each entry including an entry number for indexing the entry, at least one value, and at least one access level corresponding to the at least one value, the method comprising:
    providing a set of personalization commands for transforming the IC card application of the first format into an IC card application of a second format comprising a second plurality of entries, the set of personalization commands being independent of the first format;
    the second format further comprising a first entry including at least one value of the first plurality of entries, and a link number storing at least one entry number of the first plurality of entries, at least one value of the first plurality of entries being initialized in the second plurality of entries;
    initializing at least one value of the second format; and
    setting an access control level relating to the at least one value of the second plurality of entries in a detectable subset of the second plurality of entries.

7. A method according to claim 6, wherein the application of a first format is to be stored in a memory of an IC card.

8. A method according to claim 6, wherein initializing at least one value of the at least one value of the first format in the second format is based upon a specification for IC card personalization.

9. A method according to claim 8, wherein the specification comprises the Card Personalization Specification.

10. A method according to claim 6, wherein storing at least one access control is based upon a specification for IC card personalization.

11. A method according to claim 10, wherein the specification is the Card Personalization Specification.

12. A method according to claim 6, wherein the first entry comprises a first portion for storing the at least one value and a second portion for storing the link number.

13. A method according to claim 12, wherein the first portion also stores the access control number and is within the detectable subset.

14. A method according to claim 13, wherein the first entry further comprises a third portion for storing an index of an entry in the second plurality of entries.

15. A method according to claim 14, wherein the third portion stores a special value, for marking an entry in the detectable subset, in an entry of the detectable subset.

16. A method according to claim 12, wherein the second portion stores an index of an entry in the second plurality of entries, in an entry of the detectable subset.

17. A method according to claim 14, wherein the first entry further comprises a fourth portion for storing a length of a value of the second plurality of entries.

18. A method according to claim 17, wherein, in an entry of the detectable subset, the fourth portion reports how many access control values are stored in the respective first portion of the entry.

19. A method according to claim 6, wherein the first plurality of entries comprises a plurality of files.

20. An IC card comprising:
    an IC card substrate; and
    a processor carried by said IC card substrate and being configured to receive personalization commands to transmit data to the IC card, to store the data in a record structure having a plurality of entries, each entry including a first portion storing data values, a second portion storing a short file identifier associated with the data values, and a third portion storing a record number associated with the data values, and also configured to store the at least one access control list in a detectable subset of the plurality of entries of the record structure.

21. An IC card according to claim 20, wherein the personalization commands include an initialization of the data values.

22. An IC for an IC card comprising:
a processor configured to receive personalization commands to transmit data to the IC card, to store the data in a record structure having a plurality of entries, each entry including a first portion storing data values, a second portion storing a short file identifier associated with the data values, and a third portion storing a record number associated with the data values, and also configured to store the at least one access control list in a detectable subset of the plurality of entries of the record structure.

23. An IC card according to claim 22, wherein the personalization commands include an initialization of the data values.

* * * * *